United States Patent [19]

Saunders et al.

[11] 3,825,213
[45] July 23, 1974

[54] RELEASE MECHANISM FOR A SONOBUOY ROTOCHUTE ASSEMBLY

[75] Inventors: Roger I. Saunders, Hollis; Edward J. Cloutier, Londonderry, both of N.H.

[73] Assignee: Sanders Associates, Inc., Nashua, N.H.

[22] Filed: Mar. 1, 1973

[21] Appl. No.: 337,034

[52] U.S. Cl............................................ 244/138 A
[51] Int. Cl............................................. B64d 19/02
[58] Field of Search......... 244/138 A, 138 R; 102/4, 102/34.1, 35.4, 35.6, 37.1; 294/83 A; 74/2

[56] References Cited
UNITED STATES PATENTS
3,047,259   7/1962   Tatnall et al.................... 244/138 A

*Primary Examiner*—George E. A. Halvosa
*Assistant Examiner*—Charles E. Frankfort
*Attorney, Agent, or Firm*—Louis Etlinger; William L. Hunter

[57] ABSTRACT

A mechanism to effectuate the release of a rotochute assembly from a sonobuoy unit upon impact with the surface of water. The release mechanism comprises an arming device, a moveable inertial catch and associated latch arrangement, and a compressed spring device. When the sonobuoy unit is ejected from an airplane, the arming device is activated and the inertial catch of the release mechanism is now free to move. Upon impact with the water surface, the inertial catch disengages itself from the latch arrangement, the latch arrangement pivots away from the unit in the presence of the released compressed spring device, and the rotochute assembly is free to separate from the sonobuoy unit.

15 Claims, 11 Drawing Figures

PATENTED JUL 23 1974

RELEASE MECHANISM FOR A SONOBUOY ROTOCHUTE ASSEMBLY

BACKGROUND OF THE INVENTION

1. Field of the Invention

The present invention relates generally to the field of release mechanisms, and, more specifically to a new release mechanism designed to allow separation of a rotochute cap from the main assembly of a sonobuoy unit upon contact with the surface of the water.

2. Prior Art

Prior to the present invention, a classical method for releasing a rotochute assembly from a sonobuoy unit has been to mechanically transfer an impact force from the lower end of the sonobuoy unit to the uppermost end of the sonobuoy unit where it is used to actuate the rotochute release mechanism. Generally, the release assembly includes a striker plate positioned at the impacting end of the sonobuoy unit and a rod device which provides a mechanical interconnection between the plate and the rotochute assembly after passing through the interior of the sonobuoy unit. In operation, a water impact force against the striker plate on the sonobuoy unit causes it to move, resulting in a corresponding movement of the rod device which releases the rotochute retainer ring and thus the rotochute assembly.

A chief disadvantage of this arrangement is the necessity of having a rod device pass through the interior of the sonobuoy unit. This arrangement necessitates the use of watertight seals wherever the rod device passes through a sealed section of the sonobuoy assembly. Sealed sections are necessary because the sonobuoy unit contains numerous electrical components and circuits which must remain free of moisture or water, otherwise the electrical systems will be rendered inoperative.

Another disadvantage of using a rod device or similar styled mechanical systems is that any component which must be added to the sonobuoy unit must necessarily decrease the size of the sonobuoy payload. For example, the most efficient transfer of the impact energy occurs when the rod assembly is positioned substantially in the center of the sonobuoy unit. This means that either the physical size of the buoy must be inreased or, alternatively, it is necessary to reduce and relocate the components contained within the sonobuoy shell. For example, these components must be positioned so as to surround and not be along the center line of the sonobuoy unit and this arrangement may further affect the geometric balance of the unit when the buoy is floating in the water.

OBJECT AND SUMMARY OF THE INVENTION

Accordingly, it is a primary object of this invention to provide a novel and improved release mechanism;

It is a further object of the present invention to provide apparatus which is of a simplified construction;

It is still another object of the present invention to provide a rotochute release assembly that eliminates the need for interconnection components between the lower half of the sonobuoy unit and the rotochute assembly and thereby eliminate the need for watertight seals; and It is an additional object of the present invention to provide apparatus of the above-described description that is self contained within a rotochute assembly.

It is a further object of the present invention to eliminate the need for dynamic seals within the sonobuoy units by the elimination of the rod assembly.

Briefly, the invention is embodied in a release mechanism contained in a rotochute cap attached to a sonobuoy unit. The release mechanism comprises a mounted spring biased plate having a latch section at one end and arranged to pivot about the opposite end. The latch section normally engages a catch mechanism having a high moment of inertia and these sections are arranged to separate in the presence of an impact force. After the release of the catch mechanism, the spring biased latch plate pivots about its mounted end and the sonobuoy unit and rotochute cap are free to separate.

BRIEF DESCRIPTION OF THE DRAWINGS

For a fuller understanding of the nature of the object of the invention reference should be had to the following detained description taken in connection with the accompanying drawings, in which.

DESCRIPTION OF THE PREFERRED EMBODIMENT

Figure 1A:
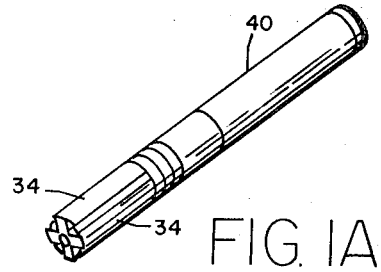
FIGS. 1a - 1d illustrates a sonobuoy unit including a rotochute assembly during the deployment stage.

A rotochute assembly embodying a release mechanism of this invention is illustrated in FIGS. 2, 3, 4 and 5 and includes a front plate 11 having a latch section 16 at one end thereof, an arming device 17, an inertial catch mechanism 20, and a compressed ring clamp 28. Briefly, once the arming device 17 vacates its position because of the centrifugal force of a spinning unit 40, an inertial catch mechanism 20, comprising latch catch mechanism 21 and arm 22, is free to move in a generally downward direction under the influence of an impact force when unit 40 decellerates rapidly due to striking any hard surface with its lower end. At this time, the latch catch 21 becomes disengaged from latch 16, and the front plate 11 is now free to pivot and move in an outwardly direction by rotating about tabs 12 positioned at the furthest end of plate 11. Once plate 11 is free from the remainder of the release mechanism, a compressed ring clamp 28 is released and the cap assembly of rotochute unit 30 then separates from the main section unit 40.

Figure 3:
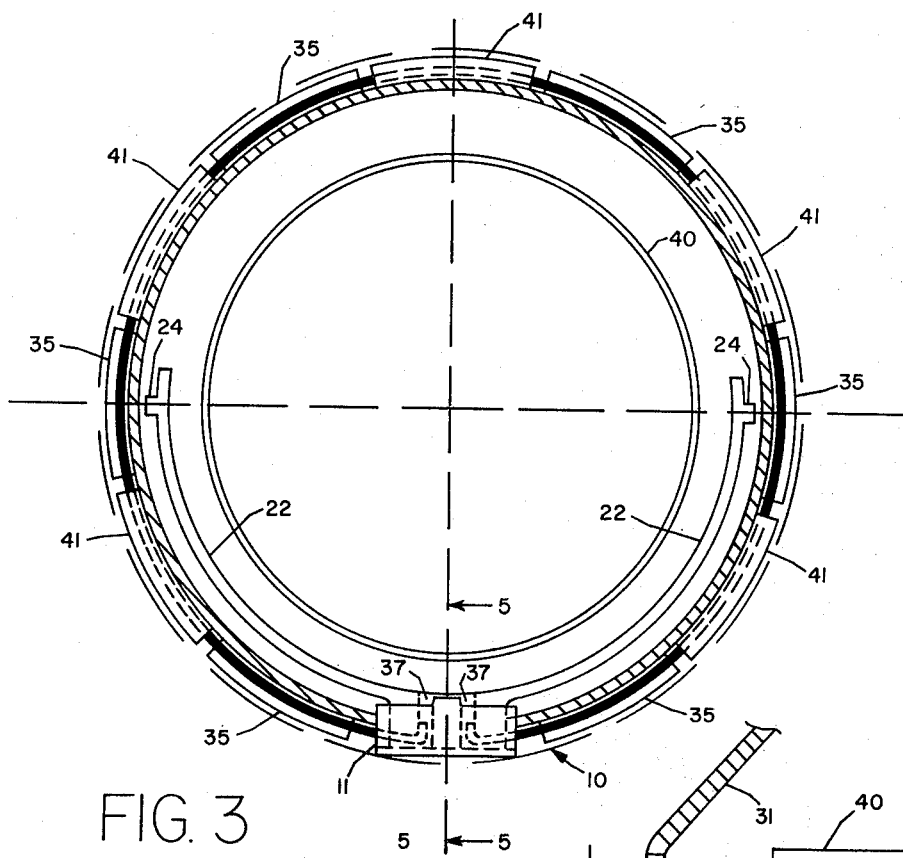
FIG. 3 is an enlarged schematic cross section view taken on the line 3-3 of FIG. 1C, illustrating the release mechanism.
Figure 4:
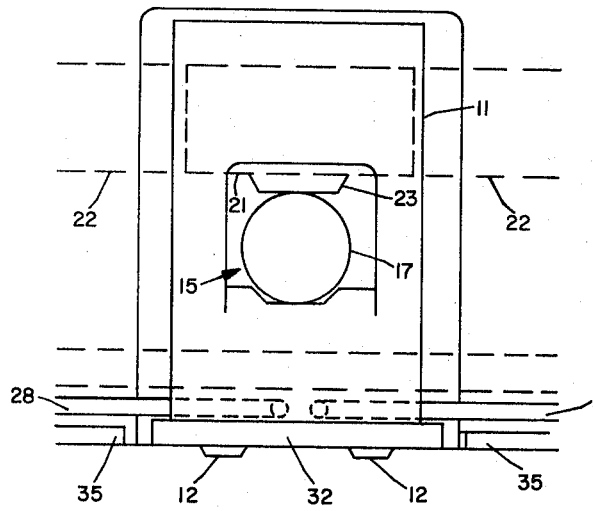
FIG. 4 is an enlarged schematic fragmentary elevation view looking toward the portion of the release mechanism shown at the bottom of FIG. 3.
Figure 5:
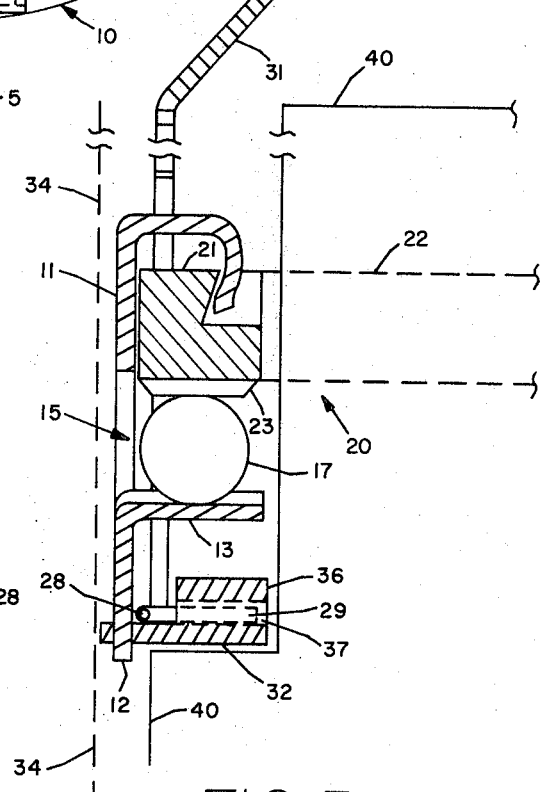
FIG. 5 is an enlarged schematic fragmentary cross section view taken on the line 5-5 of FIG. 3.

Referring now to FIGS. 3, 4 and 5, the release mechanism 10 is illustrated in detail as it is used with a sonobuoy system, the release mechanism being assembled as an integral component of a rotochute assembly and assembled in an opening in the cap thereof.

Release mechanism 10 generally comprises a front plate 11 having two projecting tab sections 12 positioned on a common side and a latch 16 formed on the opposite side, a spherical shaped arming device 17, an inertial catch mechanism 20 having two generally shaped curved arms 22 and a latch catch 21, and a C-shaped ring or clamp 28.

The front plate assembly 11 generally rectangular in shape includes a window 15 formed in the center thereof. It has been found convenient to form window 15 by making an inverted U-shape cut in front assembly 11, and then arranging the tongue portion so that it is positioned substantially perpendicular to the surface of the front plate 11 in the same direction as latch 16, and thereby forming a platform or table. Further, the sides of the table portion 13 are shaped in a generally upward direction so as to form a cradle or U-shaped device. The cradle is conveniently shaped to contain the arming device 17 but allow it to freely move along one direction of travel. One end of front plate 11 on the side of the window is bent in a generally U-shaped section to form a latch 16. The shape of latch 16 is such that it will easily engage the inertial catch mechanism 20 and also allow the separation of the two units under the presence of an external force.

The inertial catch mechanism 20 comprises two curved arm members 22 which joined together generally form a semi-circle. The two members 22 are connected one to the other by a relatively heavy and large center section 21 shaped to interconnect with latch 16. The weight of the center section 21 is selected so as to provide a high moment of inertia when section 21 is secured to latch 16. The center or catch section 21 is generally formed in the shape of a L and so positioned that one leg of the L engages latch 16 and the other leg of the L is normally positioned in a plane parallel to the table 13. One side of the center section 21 nearest table 13 is built up with the exposed surface 23, adjacent and parallel to table 13 being generally the shape of the arming device 17, thereby forming a seat. Latch catch 21 and the table 13 are so arranged that they will hold the arming device 17 securely in place when subjected to normal handling or instantaneous radial shock, but will allow the arming device to be released under a predetermined centrifugal force. Arms 22 of the inertial catch mechanism 20 are secured to a cap housing 31 of the rotochute assembly 30 substantially along a center line of housing 31, the arms 22 being secured to housing 31 by any suitable fastening means (not illustrated), such as, screws or rivets, arranged to pass through shoulder projections 24 positioned near the ends of each arm 19. The fastening devices are arranged to permit the inertial catch mechanism 20 to freely move about its connecting points.

The front plate 11 is positioned within an opening cut out of the rotochute cap housing 31. Plate 11 is secured on one end by two tab sections arranged at one end of plate 11, the tabs 12 being positioned in recesses 33 formed in a flanged supporting plate 32, which may be permanently attached to buoy skin 40.

The end of plate 11 away from the tabs is formed in the shape of a latch 16. The size of the latch 16 is arranged to function with latch catch 21, that is, to engage the latch catch 21 and allow disengagement at the appropriate time. Further, housing 31 includes a series of flanges 35 positioned at the open end of housing 31, that is, the end away from the rotochute blades 34. The flanges are arranged in a spaced apart relationship and project radially outward from the surface of housing 31.

The casing of sonobuoy unit 40 also comprises a plurality of flanges 41 arranged in a spaced apart relationship. More specifically, the flanges 41 of the sonobuoy unit 40 are arranged so that they will occupy the spaces between adjacent flanges 35 of housing 31, that is, a sonobuoy flange 41 and so forth. When the sonobuoy unit 40 and rotochute assembly 30 are secured together the respective flanges of each unit will lie in a common plane with the plane of one being substantially parallel to but spaced apart from the plane of the other such that space between the two planes may be occupied by a ring clamp 28. More particularly, when the sonobuoy unit 40 and the rotochute assembly 30 are finally assembled, the flanges 41 of the sonobuoy unit 40 will be positioned above the level of the flanges 35 of the rotochute assembly 30. The space between the respective flanges will be occupied by a C-ring clamp 28 thereby preventing the respective units from separating.

The C-ring clamp 28 is generally circular in shape but having an opening formed therein. The two ends 29 of clamp 28 are formed to project radially inward and arranged to be positioned in a recess 37 formed in a housing structure 36, an integral component of supporting flange 32. Normally, C-ring clamp 28 has a radius greater than the radius of the housing 31 of the rotochute assembly 30. When the ends 29 of the C-ring clamp are positioned in the recess 37, the radius of the C-ring clamp 28 approaches the radius of housing 31 whereby a force is created which tends to return the clamp to its normal position. Clamp 28 is prevented from springing outward by the front plate 11 which incidently is positioned adjacent to housing 36.

The arming device 17 is generally spherical in shape although it may be of any shape as long as the device will escape from its seated position between the inertial catch mechanism 21 and table 13, and freely pass through window 15 formed in the face of front plate 11.

Describing now the operation of the rotochute release assembly, reference is made to FIGS. 1 and 2, where the release mechanism 10 of the rotochute assembly 30 is illustrated at successive periods of time as measured during a deployment sequence when the combined assemblies are ejected from an aircraft until the sonobuoy unit strikes the water surface. When the individual assemblies are fully assembled and ready for use, the arming device 17 is held captive in its seated position to prevent premature release of the mechanism such as might occur if the assembly is subject to a radial or axial shock. The blades 34 of the rotochute assembly 30 are folded in a position parallel to the long sides of the sonobuoy unit 40. When the blades are in this position, arming device 17 is held captive in the space between the sonobuoy skin 40 and the inside surface of the folded rotochute blades 34, as seen in FIG. 2a. Also the sides of the table 13 and curved surface 23 of latch catch 21 prevent any transverse movement by the arming device 17, as illustrated in FIG. 5.

Figure 1B:
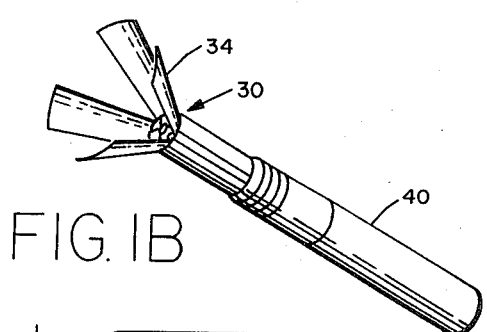
Figure 1C:
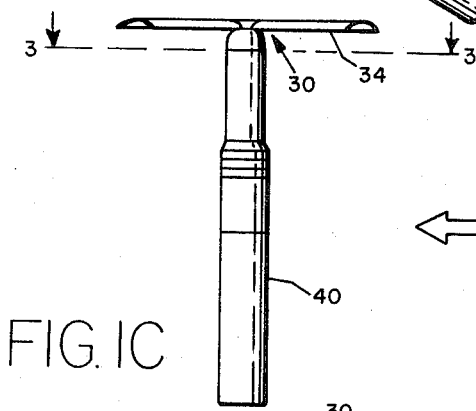
Figure 2A:
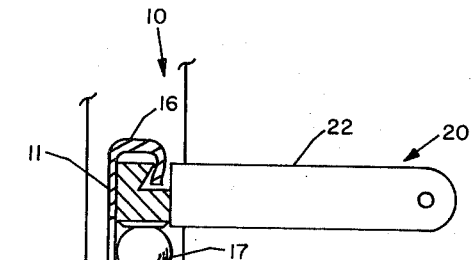
FIGS. 2a - 2b illustrates the operation of a release mechanism during corresponding periods of the deployment stage.
Figure 2B:
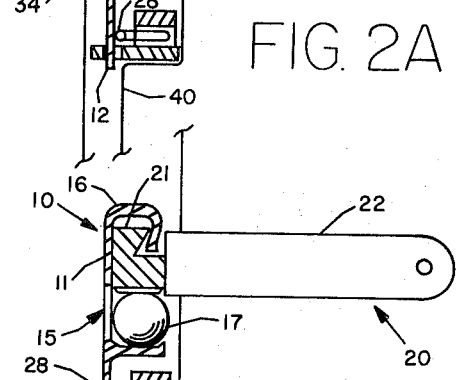
Figure 2C:
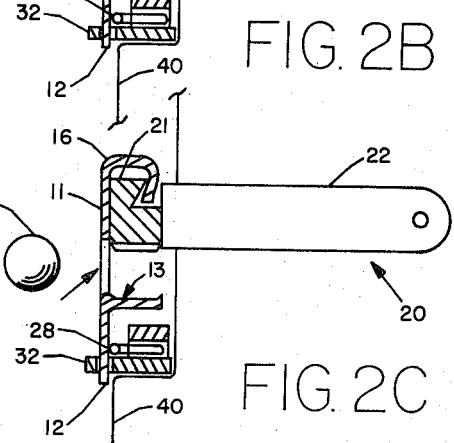
Figure 2D:
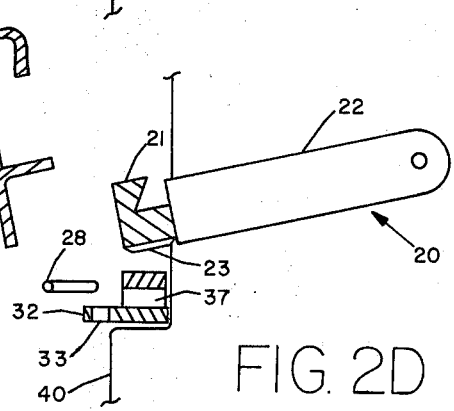

Soon after the combined assembly is launched, the blades 34 of the rotochute assembly swing in an upward direction until they are substantially perpendicular to the longitudinal length of the sonobuoy unit 40, as seen in FIG. 1b, thereby exposing window 15 in front plate 11 as seen in FIG. 2b. At this initial period of time, however, only an axial acceleration force is imposed upon the launched unit until the sonobuoy assembly reaches a terminal velocity. This force is usually insufficient to cause the arming device 17 to move radially from its captive or detent position. As the buoy assembly descends, the rotochute blades 34 causes the assembly to pick up rotational speed until a speed is reached where the angular velocity generates a centrifugal force sufficient to cause arming device 17 to slip from its seated position between latch catch 21 and table 13 and then pass through window 15 of front plate 11, as illustrated in FIG. 2c.

Figure 1D:
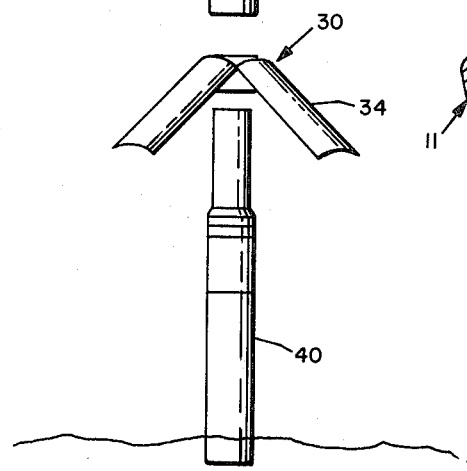

At this time, the rotochute release mechanism is now armed, but as previously illustrated, latch 16 and latch catch 21 are engaged thereby preventing a premature disengagement of the combined assemblies. When the sonobuoy assembly strikes the surface of the water, as illustrated in FIG. 1d, the impact force drives the inertial catch mechanism 20, comprised of latch catch 21 and arms 22, in a downward direction relative to latch 16 and thereby freeing or disengaging the upper portion of front plate assembly 11. At this time, front plate 11 is now free to pivot in an outward direction about tabs 12 and in fact does so in part by the centrifugal force of the rotating assembly and in part by the spring force exerted by the compressed ring clamp 28. Front plate 11 now swings free of the sonobuoy assembly and the ends 29 of ring clamp 28 spring radially outward from recesses 37 in the supporting block 32 (illustrated in FIG. 3). Now the ring clamp 28 is free of the combined assembly and the rotochute assembly 30 is now free of but not disengaged from sonobuoy unit 40.

The rotochute assembly 30 is subsequently separated from the sonobuoy unit 40 when the rotochute blades 34 strike the water surface and are abruptly retarded while the substantial momentum and relatively low drag of the sonobuoy unit 40 permits it to continue rapidly into the water. One may wish to incorporate an additional force such as a spring positioned beneath or between the top of sonobuoy unit 40 and the inside of the cap of the rotochute assembly to assist in separating the rotochute assembly 30 from the sonobuoy unit 40.

While in the foregoing, I have described certain preferred forms and methods of practicing my invention, it is to be understood that this description is made only by way of example and not as a limitation thereon for one skilled in the art may make modifications and changes thereto without departing from the true spirit and scope thereof.

What is claimed is:

1. A release mechanism for a launched device having a first section removeably mounted on a second section, comprised of a spring biased release plate mounted to one of said sections and arranged for pivotable movement about one end of said plate, and first means to secure said plate in a spring biased position, said first means secured to one of said sections and arranged to be moveable between two positions to allow when in one of said positions said release plate to be free to pivot about said mounted end to permit the separation of said first section from said second section.

2. Apparatus as defined in claim 1 wherein said first means having a high moment of inertia when in the other of two positions and upon impact with a solid surface said first means moves to the other of said two positions.

3. Apparatus as defined in claim 1 wherein said plate is spring biased by a split ring clamp arranged to engage said first and second sections, said ring clamp exerting a force when held in a compressed state by said release plate.

4. An impact release mechanism for a launched electronic device having a housing and a releasable rotochute assembly, said rotochute assembly comprised of a cap unit having an opening in a surface thereof, mounted on said housing;

an inertial catch means arranged to move between a first and second position; and a spring biased latch means mounted and arranged to be pivoted about one end thereof, said latch means engaging said inertial catch means when in said first position to prevent said inertial catch means from moving to said second position, and said inertial catch means being moveable to said second position upon impact with a solid surface to permit said latch means to pivot about said end in the presence of the spring force to permit said cap to separate from said housing.

5. Apparatus as defined in claim 4 wherein said release mechanism includes a moveable arming means positioned to secure said inertial catch means in said first position to prevent accidental movement thereof, said arming means arranged to move when acted upon by an external force to permit said inertial catch means to be free to move.

6. Apparatus as defined in claim 5 wherein said arming means is substantially circular in shape; and said latch means includes a face plate section substantially parallel to the side of said housing, said face plate having an opening therein and a supporting member substantially perpendicular to said plate having a surface thereof substantially level with said opening, said supporting member arranged to position said arming means against said inertial catch means and to permit said arming means to escape through said opening when acted upon by a radial force created during the launch and descent of said device.

7. Apparatus as defined in claim 6 wherein said inertial catch means is in frictional engagement with one end of said face plate, said face plate preventing said inertial catch means from moving to said second position after said arming means has exited through said opening.

8. Apparatus as defined in claim 7 wherein said end of face plate engaged with said inertial catch means is a curved section having the general shape of a hook, said curved section arranged to be mated with a cutout in said inertial catch means.

9. Apparatus as defined in claim 8 wherein said face plate includes at lease one tab member positioned on the end opposite said hook section, said tab section arranged to mate with a flange mounted on said cap unit to permit said face plate to pivot about said tab member.

10. Apparatus as defined in claim 8 wherein said face plate includes at least one tab member positioned on the end opposite said hook section, said tab section arranged to mate with a flange section mounted on said housing to permit said face plate to pivot about said tab unit.

11. Apparatus as defined in claim 10 wherein said release mechanism includes a moveable arming means positioned to secure said catch means in said first position to prevent accidental movement thereof, said arming means arranged to move upon the presence of a radial force created by the rotational movement of said sonobuoy after it is launched thereby permitting said catch means to move to said second position upon water impact of the sonobuoy.

12. Apparatus as defined in claim 8 wherein said inertial catch means comprises a first and second curved arm member each mounted at one end thereof to said cap unit and a center catch unit mounted to adjacent ends of said curved members opposite the mounted ends, said center catch unit having a section removed therefrom and arranged to receive said curved section of said face plate, and said center catch unit having sufficient weight to provide a high moment of inertia when said inertial catch means is in said first position.

13. Apparatus as defined in claim 4 wherein said spring bias is formed by a compressed ring clamp having a section removed, said ring clamp arranged to engage flange type sections alternately protruding from said housing and said cap unit, and the area of said spring clamp with the section removed is positioned adjacent to said latch means.

14. Apparatus as defined in claim 13 wherein said inertial catch means upon impact with a solid surface moves to said second position whereby said latch means is disengaged from said inertial catch means and free to pivot about said end of said latch means under the force of said ring clamp, said ring clamp upon expanding disengages from said flange sections to permit said housing and said rotochute assembly to separate.

15. A water impact release mechanism for an air launched sonobuoy having a housing for the sonobuoy's electrical units and a rotochute assembly, said rotochute assembly comprised of
   a cap unit mounted on said housing,
   a catch means having a high moment of inertia mounted on said cap unit and arranged to move between a first and second position; and
   a spring biased latch means mounted on said housing and arranged to pivot about one end thereof, said latch means in frictional engagement with said catch means, said latch means retaining said catch means in said first position until water impact moves said catch means to said second position whereby said latch means is disengaged from said inertial catch mechanism and free to pivot about said mounted end under the force of said spring bias to permit said cap and said housing to separate.

* * * * *